United States Patent
Kono (10) Patent No.: US 9,868,358 B2
(45) Date of Patent: Jan. 16, 2018

(54) POWER CONVERSION SYSTEM SUPPRESSING REDUCTION IN CONVERSION EFFICIENCY

(71) Applicant: DENSO CORPORATION, Kariya, Aichi-pref. (JP)

(72) Inventor: Toshiyuki Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 490 days.

(21) Appl. No.: 14/546,383

(22) Filed: Nov. 18, 2014

(65) Prior Publication Data

US 2015/0137592 A1 May 21, 2015

(30) Foreign Application Priority Data

Nov. 18, 2013 (JP) .................................. 2013-238111

(51) Int. Cl.
*B60L 1/00* (2006.01)
*B60L 3/00* (2006.01)
(Continued)

(52) U.S. Cl.
CPC ....... *B60L 11/1812* (2013.01); *B60L 11/1861* (2013.01); *B60L 11/1868* (2013.01);
(Continued)

(58) Field of Classification Search
CPC ...... H02M 2001/0048; H02M 3/33507; Y02B 70/1491; B60L 11/1812
See application file for complete search history.

(56) References Cited

U.S. PATENT DOCUMENTS

2006/0226710 A1 10/2006 Kawasaki et al.
2008/0130336 A1* 6/2008 Taguchi .............. H02M 1/4225
363/125
(Continued)

FOREIGN PATENT DOCUMENTS

JP 3796353 4/2006
JP 2006/288102 10/2006
(Continued)

OTHER PUBLICATIONS

Office Action (2 pgs.) dated Oct. 27, 2015 issued in corresponding Japanese Application No. 2013-238111 with an at least partial English-language translation (2 pgs.).

*Primary Examiner* — Jared Fureman
*Assistant Examiner* — Esayas Yeshaw
(74) *Attorney, Agent, or Firm* — Nixon & Vanderhye PC (57) ABSTRACT

A power conversion system includes a DC-DC converter, a voltage detector, a current detector and a controller. The controller controls the DC-DC converter such that the DC-DC converter starts outputting power when the output voltage detected by the voltage detector is below a predetermined voltage and stops outputting the power when the output current detected by the current detector is below a reference current that corresponds to the conversion efficiency being larger than or equal to a predetermined conversion efficiency. The reference current is determined as a current value at which the conversion efficiency is decreased to be lower than the predetermined conversion efficiency when the output current exceeds the current value. The controller includes a limiting means that limits the output current not to exceed the reference current while the DC-DC converter is outputting the power.

12 Claims, 6 Drawing Sheets

(51) Int. Cl.
  *H02G 3/00* (2006.01)
  *B60L 11/18* (2006.01)
  *H02M 3/335* (2006.01)
  *H02M 1/00* (2006.01)

(52) U.S. Cl.
  CPC ..... *H02M 3/33507* (2013.01); *B60L 2210/10* (2013.01); *B60L 2240/525* (2013.01); *H02M 2001/0048* (2013.01); *Y02B 70/1491* (2013.01)

(56) References Cited

U.S. PATENT DOCUMENTS

| | | | |
|---|---|---|---|
| 2010/0104896 A1* | 4/2010 | Johnson | H01M 8/04492 429/410 |
| 2012/0306287 A1* | 12/2012 | Kim | H02J 17/00 307/104 |
| 2013/0054069 A1 | 2/2013 | Komiya et al. | |
| 2013/0187446 A1* | 7/2013 | Ferrel | B60L 11/14 307/9.1 |
| 2013/0257150 A1* | 10/2013 | Kawasaki | B60L 11/1811 307/10.1 |
| 2015/0019055 A1* | 1/2015 | Nie | B60R 16/03 701/22 |
| 2016/0204703 A1* | 7/2016 | Ishigaki | H02M 3/02 307/43 |
| 2016/0218628 A1* | 7/2016 | Yao | H02M 3/33507 |

FOREIGN PATENT DOCUMENTS

| | | |
|---|---|---|
| JP | 2010-41826 | 2/2010 |
| JP | 2013-66365 | 4/2013 |

\* cited by examiner

POWER CONVERSION SYSTEM SUPPRESSING REDUCTION IN CONVERSION EFFICIENCY

CROSS-REFERENCE TO RELATED APPLICATION

This application is based on and claims the benefit of priority from earlier Japanese Patent Application No. 2013-238111 filed Nov. 18, 2013, the description of which is incorporated herein by reference.

BACKGROUND (Technical Field)

The present disclosure relates to a power conversion systems. More particularly, the present disclosure relate to a power conversion system in which voltage is converted by a DC-DC converter to supply converted power to a power storage apparatus and an electrical load.

(Description of the Related Art)

The power conversion system has been employed in a vehicle system mounted on a vehicle such as an electric vehicle or a hybrid vehicle. For example, the electric vehicle or the hybrid vehicle is provided with a main battery used to supply power to main equipment that drives the vehicle and a sub battery used to supply low voltage power necessary for vehicle control or lighting, or to another electrical load. The sub battery is charged by being supplied power from the main battery. Since the output voltage of the main battery is higher than the output voltage of the sub battery, a DC-DC converter is used to step down the output voltage so as to supply power to the sub battery from the main battery. In this respect, to reduce energy loss of the DC-DC converter, Japanese Patent Number 379653 discloses a technique in which the output current of the DC-DC converter is compared with a predetermined value corresponding to maximum conversion efficiency of the DC-DC converter and the DC-DC converter stops outputting the power when the output current of the DC-DC converter is lower than or equal to the predetermined value.

In the above-described technique, after the output power of the DC-DC converter is stopped because the output current of the DC-DC converter is lower than or equal to the predetermined value and, when the output power is resumed, the output current of the DC-DC converter flows through the sub battery as a charge current and also flows through an electrical load. In this case, the DC-DC converter is designed such that the output current (i.e., charge current) is higher than or equal to the predetermined value even when the current flowing through the electrical load is zero. Therefore, while the electrical load has been driven by the battery, the output current of the DC-DC converter flows into the electrical load, whereby the output current of the DC-DC converter exceeds the predetermined value (current value corresponding to the maximum efficiency). Moreover, depending on state of the sub battery, charge current flowing into the sub battery becomes higher so that the output current of the DC-DC converter is likely to exceed the predetermined value significantly. In this respect, the inventor has confirmed that the conversion efficiency is decreased when the output current of the DC-DC converter is increased.

SUMMARY

The embodiment provides a power conversion system in which a decrease of the conversion efficiency can be suppressed while the DC-DC converter is outputting power.

As an aspect of the present disclosure, a power conversion system includes: a DC-DC converter electrically connected to an electrical load and a power storage apparatus, the power storage apparatus supplying power to the electrical load, the DC-DC converter converting a voltage of a DC power supplied to the DC-DC converter with a conversion efficiency and outputting power to the electrical load and the power storage apparatus; a voltage detector that detects an output voltage of the power storage apparatus as a voltage detection value; a current detector that detects an output current of the DC-DC converter as a current detection value; and a controller that controls the DC-DC converter such that the DC-DC converter starts outputting the power when the voltage detection value detected by the voltage detector is below a predetermined voltage and stops outputting the power when the current detection value detected by the current detector is below a reference current that corresponds to the conversion efficiency being larger than or equal to a predetermined conversion efficiency.

Further, the reference current is determined as a current value at which the conversion efficiency is decreased to be lower than the predetermined conversion efficiency when the output current exceeds the current value in response to an increase in the output current. Moreover, the controller includes a limiting means configured to limit the output current not to exceed the reference current while the DC-DC converter is outputting the power.

According to the above-described configurations, the DC-DC converter intermittently outputs power to the electrical load and the power storage apparatus. When the output voltage of the power storage apparatus decreases and the DC-DC converter outputs power to the electrical load and the power storage apparatus, voltage difference is produced between the open-end voltage of the power storage apparatus and the output voltage of the DC-DC converter, whereby current determined by the voltage difference flows into the power storage apparatus. Further, since the current flows into the electrical load as well, current exceeding the reference current is likely to flow from the DC-DC converter so that the conversion efficiency may be decreased. Therefore, the output current of the DC-DC converter is outputted with current limitation, whereby a decrease of the conversion efficiency caused by the output current of the DC-DC converter exceeding the reference current can be suppressed.

DETAILED DESCRIPTION OF THE PREFERRED EMBODIMENTS

First Embodiment

The power conversion system according to the first embodiment is mounted on a hybrid vehicle. The power conversion system converts power supplied by the main battery and supplies an electrical load and a sub battery as a power storage apparatus. The main battery is a battery pack constituted by a lithium ion battery and the sub battery is a lead acid battery. The output voltage of the main battery is approximately 200 volts and the output voltage of the sub battery is approximately 12 volts.

Figure 1:
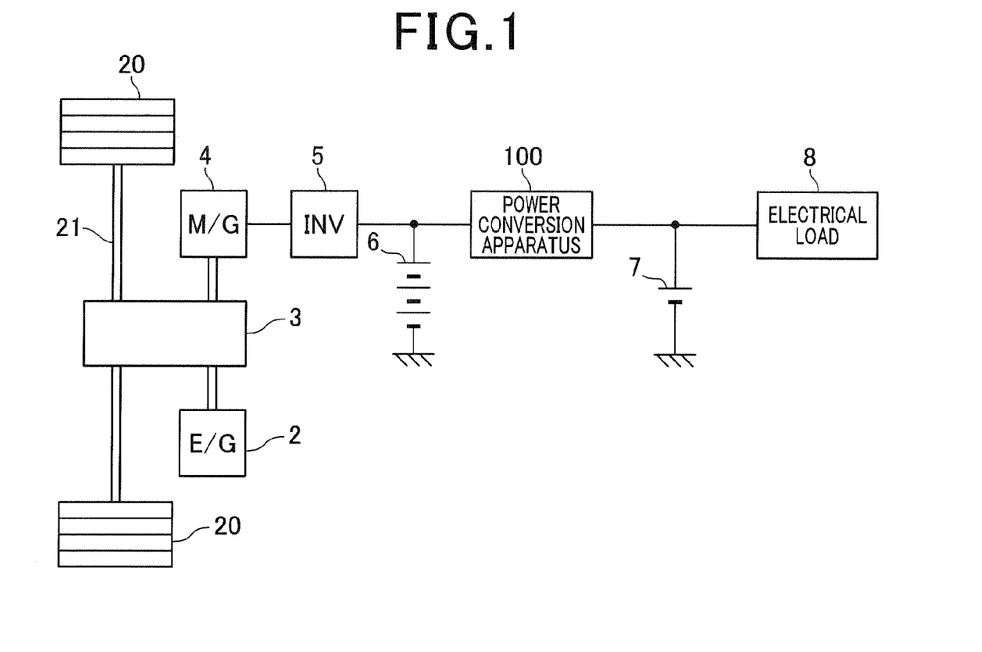
FIG. 1 is a block diagram showing an overall configuration of the hybrid vehicle.

A configuration of the above-described hybrid vehicle is illustrated in FIG. 1. As shown in FIG. 1, drive force of an internal combustion engine 2 and a motor generator 4 is transmitted to a shaft 21 and a drive wheel 20 via a power transfer 3.

The motor generator 4 has a function to generate power by a driving force applied by the power transfer 3 depending on the driving state of the hybrid vehicle, in addition to the power transfer 3. The AC power generated by the motor generator 4 is converted to DC power by the inverter 5. The converted DC power is used to charge the main battery 6. The power charged in the main battery 6 is converted to AC power by the inverter 5 and supplied to the motor generator 4. Also, the power charged in the main battery 6 is stepped down by a power conversion apparatus 100 and supplied to the sub battery 7. The sub battery 7 supplies power to an electrical load 8 that requires low voltage (12 volts).

Figure 2:
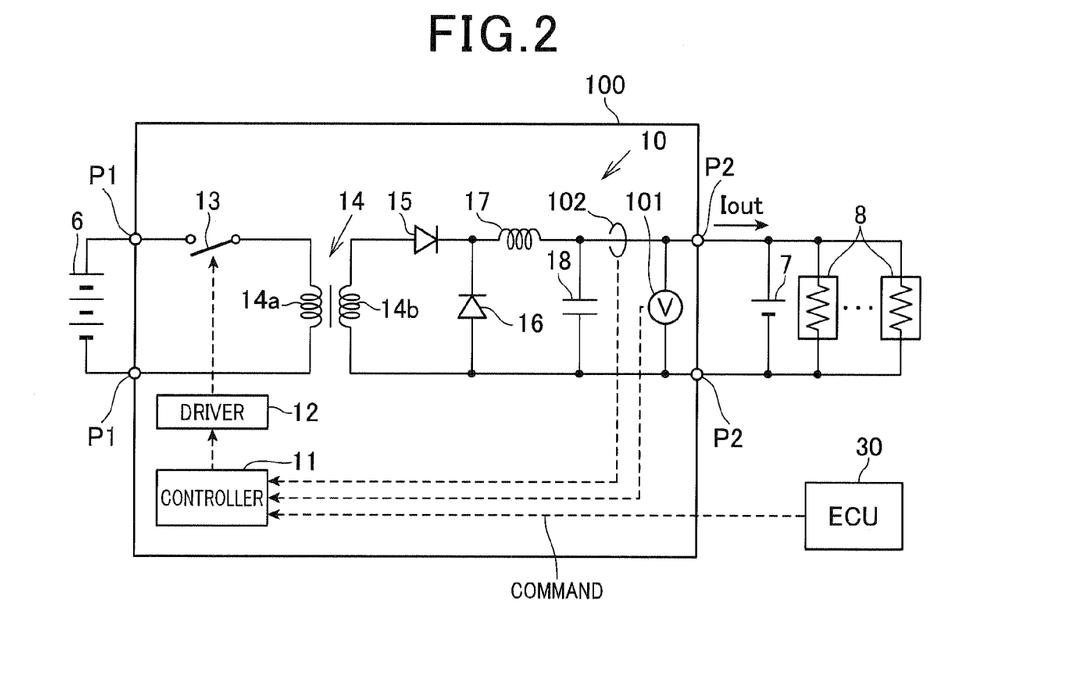
FIG. 2 is a circuit diagram showing an electrical configuration of a power conversion system.

FIG. 2 is a circuit diagram showing an electrical configuration of the power conversion system according to the first embodiment. In the power conversion apparatus 100, the DC-DC converter 10 is constituted by an insulated DC-DC converter in which the output voltage of the main battery 6 is stepped down to supply the sub battery 7 and the electrical load 8 with the stepped down voltage.

At a main battery terminal P1 of the DC-DC converter 10, a power switching element 13 and a primary coil 14a of a transformer 14 are connected in series. At a secondary coil 14b of the transformer 14, a diode 15 and a coil 17 are connected in series. A diode 16 is connected to a portion between the diode 15 and the ground potential. A capacitor 18 is connected to a portion between the output terminal of the coil 17 and the ground potential.

In this configuration, the output of the DC-DC converter 10 is controlled by a switching control that repeatedly switches On and Off of the power switching element 13. Moreover, a voltage sensor 101 that outputs a signal responding to the voltage of the output terminal P2 of the DC-DC converter 10 is disposed between the capacitor 18 and the DC-DC converter 10. The output terminal P2 of the DC-DC converter 10 and the sub battery 7 are connected by a lead wire so that the voltage at the output terminal of the DC-DC converter 10 and the sub battery 7 can be regarded as the same voltage. Hence, the voltage sensor 101 serves as a voltage detector that detects the output voltage of the sub battery 7.

Also, at a portion between the capacitor 18 and the output terminal P2 of the DC-DC converter 10, a current sensor 102 is provided as a current detector that outputs a signal responding to the output current Iout outputted from the output terminal P2 of the DC-DC converter 10.

The switching control is performed by a controller 11. The controller 11 is constituted by a microcomputer including a CPU and a memory device. The controller 11 controls the output of the DC-DC converter 10 to be a desired voltage and current based on a signal transmitted from the voltage sensor 101 and the current sensor 102 and a command transmitted from an ECU (electronic control unit) 30 that controls the entire vehicle system. In more detail, a drive pulse is outputted to the power switching element 13 via the driver 12, thereby switching the power switching element to be on and off.

The controller 11 controls the output power of the DC-DC converter 10 by using a PWM (pulse width modulation) control. In other words, the controller 11 adjusts the ratio of the on period to the off period of the power switching element 13 (i.e., duty ratio) so as to set the voltage or the current outputted by the DC-DC converter 10 to be a desired value. Here, in the DC-DC converter 10, depending on the output power, a command value Vout corresponding to the output voltage is variably set and the output voltage is adjusted in response to Vout. However, since the output voltage of the sub battery 7 is applied to the voltage sensor 101 via the output terminal P2, the voltage sensor 101 always detects the output voltage of the sub battery 7 (detected value Va=the battery voltage). For example, when the output of the DC-DC converter 10 is suspended, the command value Vout of the output voltage is 0 volts, however, the detected value Va of the voltage sensor 101 is not 0 volts, but the output voltage of the sub battery 7.

The controller 11 enables the DC-DC converter 10 to output the power depending on a state of charge in the sub battery 7. While the sub battery 7 supplies power to the electrical load 8, the controller 11 enables the DC-DC converter 10 to output power when the output voltage of the sub battery 7 becomes below a predetermined lower limit value V1 of the reference voltage. At this point, power is supplied to the electrical load 8 in addition to a charging of the sub battery 7 by the output power of the DC-DC converter 10. It is noted that the reference voltage is determined within a voltage range that enables the respective electrical load 8 to be driven properly and its lower limit value is set to be V1 and the upper limit value is set to be V2. The lower limit value V1 is determined such that a predetermined margin voltage is added to the highest voltage among voltages capable of driving the respective electrical load 8. Taking suppressing a degradation of the sub battery 7 into consideration, the lower limit value V1 of the reference voltage may be set to be a value that avoids over discharge of the sub battery 7. Also, considering ripple voltage and noise, the upper limit value V2 of the reference voltage is set to be a value that avoids over voltage of the sub battery 7 and the electrical load 8.

Figure 3:
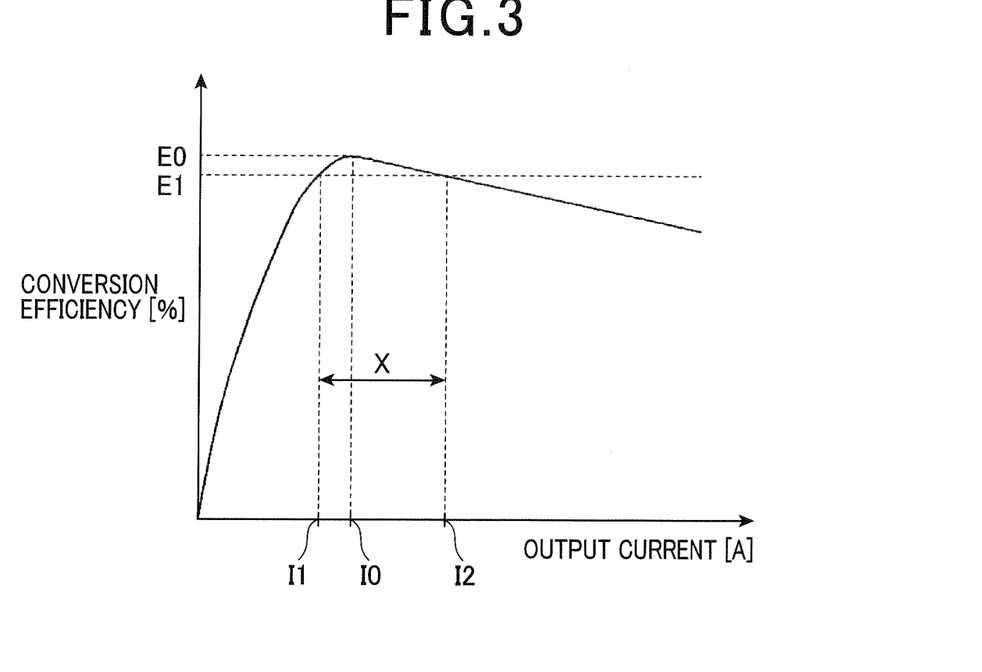
FIG. 3 is a graph showing output current vs conversion efficiency of a DC-DC converter.

The conversion efficiency of the DC-DC converter 10 has conversion characteristics as shown in FIG. 3. In the conversion characteristics, a predetermined current I0 (e.g., 20 A) corresponding to the maximum value E0 (e.g., 85%) in the conversion efficiency E exists. Specifically, as shown in FIG. 3, when the output current Iout is below the predetermined current I0, as the output current Iout increases, the conversion efficiency E increases. When the output current Iout reaches the predetermined current I0, the conversion efficiency becomes the maximum value E0. The higher the output current Iout to be higher than the predetermined current I0, the gradually lower the conversion efficiency E.

According to the first embodiment, to maintain high conversion efficiency of the DC-DC converter 10 during the power conversion, the output current Iout is controlled based on the above-described conversion characteristics. Specifically, it is determined that a reference current zone X (I1 to I2) that enables the conversion efficiency E to be higher than or equal to a predetermined value E1 (e.g. 80%) and the output of the DC-DC converter 10 is controlled so as to maintain the output current Iout to be between the lower limit value I1 and the upper limit value I2 in the reference current zone X.

In this case, the controller 11 as a limiting means executes a current-limiting process while the DC-DC converter 10 outputs power, such that the output current Iout does not exceeds the upper limit value I2. Moreover, when the charging of the sub battery 7 advances and the output current Iout is decreasing, the controller 11 suspends outputting power of the DC-DC converter 10 under a condition that the output current Iout becomes lower than the lower limit value I1. According to the first embodiment, the reference current is determined by the reference current zone X so that the output current Iout can be maintained, by the above-described current control, to be the reference current. Thus, since the output current Iout is controlled to be within I1 to I2, the conversion efficiency E can be avoided from lowering, whereby the power loss at the DC-DC converter 10 can be suppressed.

The DC-DC converter 10 starts outputting power when the output voltage of the sub battery 7 decreases below voltage V1 and suspends outputting the power when the output current Iout decreases below I1. The DC-DC converter outputs power intermittently by enabling the output power to start and suspend repeatedly.

According to the first embodiment, two operation modes including an intermittent output mode (limiting mode) and a continuous output mode (disabled limiting mode) are defined. In the intermittent output mode, the outputting power is started and suspended alternately. In the continuous output mode, the outputting power is continuously operated. These two modes are switched depending on a drive request of the electrical load 8.

In other words, at least some of a plurality of electrical loads 8 are drive loads driven with a predetermined drive condition. The load current Ir required for the entire electrical load 8 significantly increases if many of the drive loads are driven. In this case, when the required load current of the electrical load 8 is relatively large, it is preferable to prioritize driving the electrical load 8. In this respect, according to the first embodiment, a current value I3 is used to perform a magnitude comparison of the required load current of the electrical load 8. Then, the operation mode is set to be the continuous output mode when the required load current is higher than the current value I3, and the output current Iout is not limited. In the continuous output mode, the controller 11 performs a constant voltage control in which the command value Vout for the output voltage of the DC-DC converter 10 is set to be a predetermined voltage V3 (V1<=V3<=V2) in the reference voltage range. According to the continuous output mode in which the current limiting is not performed, an amount of the current flowing through the electrical load 8 is lower than the required load current, so that the electrical load 8 is prevented from unstable operation.

Figure 4:
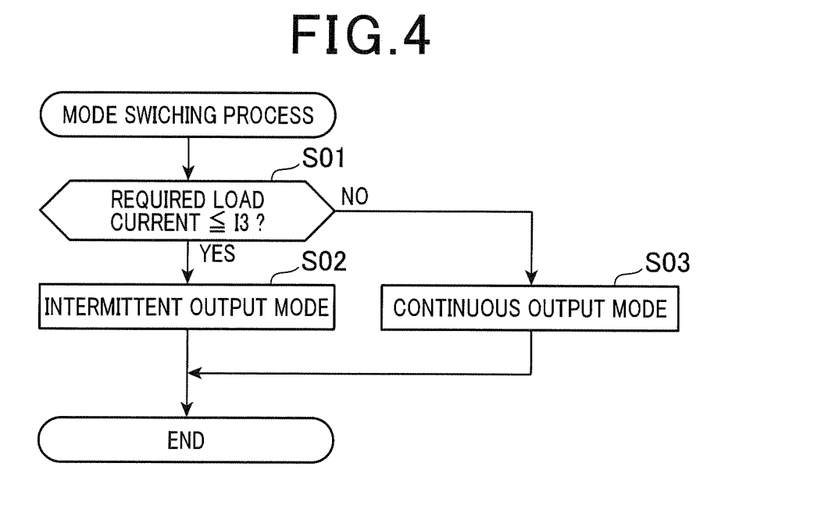
FIG. 4 is a flowchart showing a mode switching process.

FIG. 4 is a flowchart showing a mode switching process of the DC-DC converter 10. The mode switching process is repeatedly executed at every predetermined period by the controller 11 so as to switch the control mode of the DC-DC converter.

At step S01, the process acquires state of the electrical load 8 from the ECU 30 and determines whether or not the required current of the electrical load 8 is lower than or equal to the current value I3. When the required current of the electrical load 8 is lower than or equal to the current value I3 (S01: YES), the process sets, at step S02, the control mode of the DC-DC converter to be the intermittent output mode and terminates the process. Further, when the required current of the electrical load 8 is higher than the current value I3 (S01: NO), the process sets, at step S03, the control mode of the DC-DC converter 10 to be the continuous mode and terminates the process.

Figure 5:
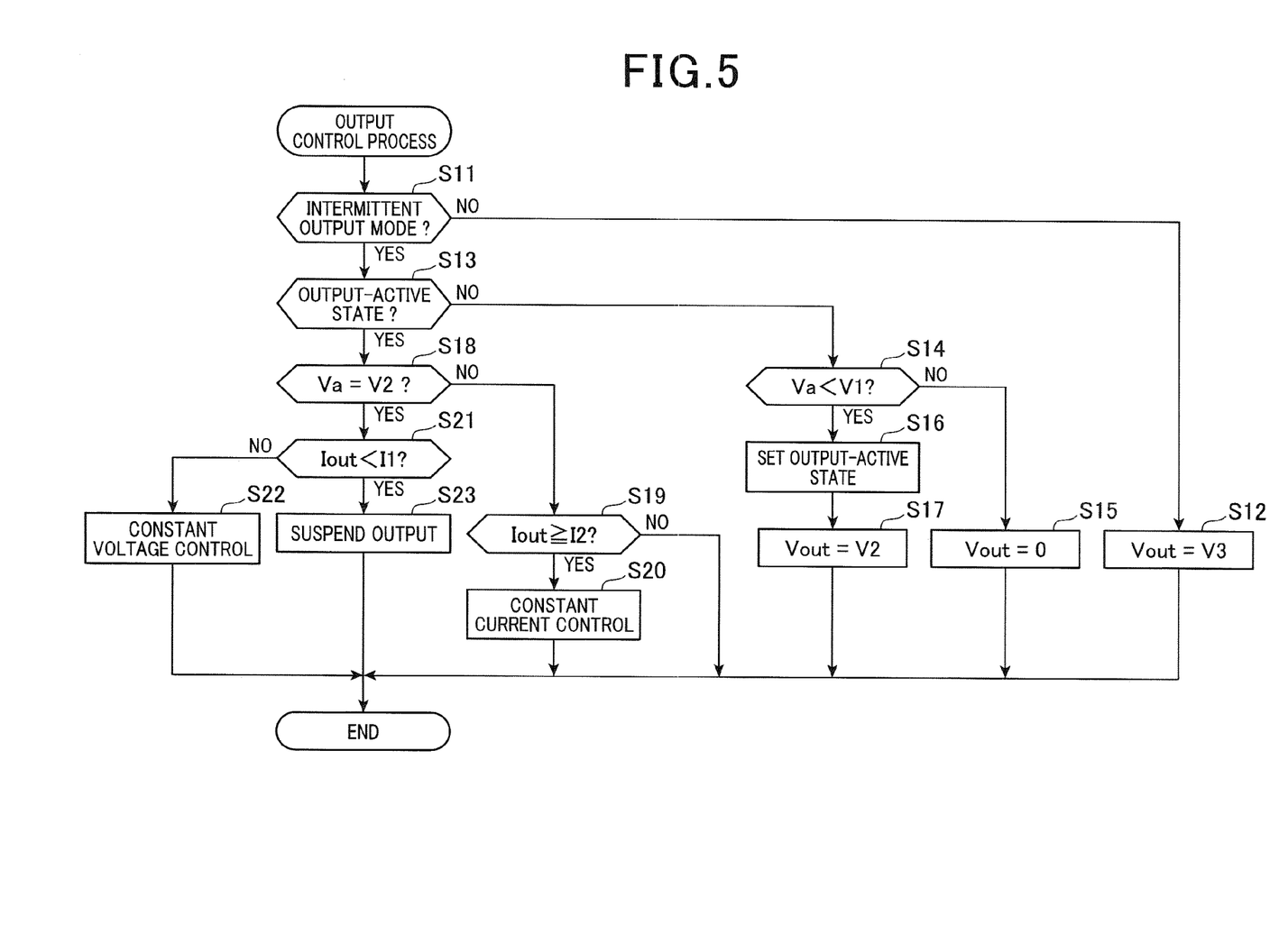
FIG. 5 is a flowchart showing an output control process.

FIG. 5 is a flowchart showing an output control process of the DC-DC converter 10. This output control process is repeatedly executed at every predetermined period.

At step S11, the process determines whether the control mode of the DC-DC converter 10 is set as the intermittent output mode or the continuous output mode. When the control mode of the DC-DC converter is set as the continuous output mode (S11: NO), the process sets the command value Vout of the output voltage to be a predetermined voltage V3 and terminates the process.

When the control mode is set as the intermittent output mode (S11: YES), the process determines, at step S13, whether or not the DC-DC converter is in an output-active state. When the process determines that the DC-DC converter is in an output-suspend state (S13: NO), the process determines, at step S14, whether or not the detected value Va (output voltage of the sub battery 7) of the voltage sensor 101 is lower than the lower limit value V1 of the reference voltage. When the detected value Va of the voltage sensor 101 is higher than or equal to the lower limit value V1 (S14: NO), since charging of the sub battery 7 by the DC-DC converter is not necessary, the process sets, at step S15, the command value Vout of the output voltage of the DC-DC converter 10 to be 0 volts and terminates the process.

Also, when the detected value Va is lower than the lower limit value V1 (S14: YES), the process sets, at step S16, the DC-DC converter to be in the output-active state. Then, at step S17, the process sets the command value Vout of the output voltage to be the upper limit value V2 and terminates the process. The upper limit value V2 represents a voltage value that enables the current to increase immediately after the DC-DC converter 10 starts to operate, exceeding the upper limit value I2 of the reference current zone X. The upper limit value V2 corresponds to the initial command value. By setting the V2 as an initial command value, the output current Iout promptly increases immediately after the DC-DC converter 10 starts to output power.

When the process determines that the DC-DC converter is in the output-active state (S13: YES), the process determines, at step S18, whether or not the detected value Va reaches the upper limit value V2. When the detected value Va is lower than the upper limit value V2 (S18: NO), the process determines, at step S19, whether or not the output current Iout reaches the upper limit value I2. When the process determines that the output current Iout is lower than the current I2 (S19: NO), terminates the process. At this point, the command value Vout of the output voltage has been set as the upper limit value V2 and this value is maintained.

When the output current Iout reaches the current I2 (S19: YES), the process performs, at step S20, a constant current control so as to keep the output current Iout to be the current I2 and terminates the process. According to the constant current control performed at step S20, the output current Iout maintains the current I2 so that the output current Iout is avoided from exceeding the current I2.

When the detected value Va reaches the upper limit value V2 (S18: YES), the process determines, at step S21, whether or not the output current Iout is lower than the lower limit value I1 of the reference current zone X. When the output current Iout is higher than or equal to the current I1 (S21: NO), the process performs, at step S22, the constant voltage control so as to keep the detected value Va to be the upper limit value V2. Then, when the output current Iout decreases due to charging of the sub battery 7 and the output current Iout becomes lower than the lower limit value I1 (S21: YES), the process controls the DC-DC converter 10, at step S23, to be the output-suspended state and terminates the process.

Figure 6:
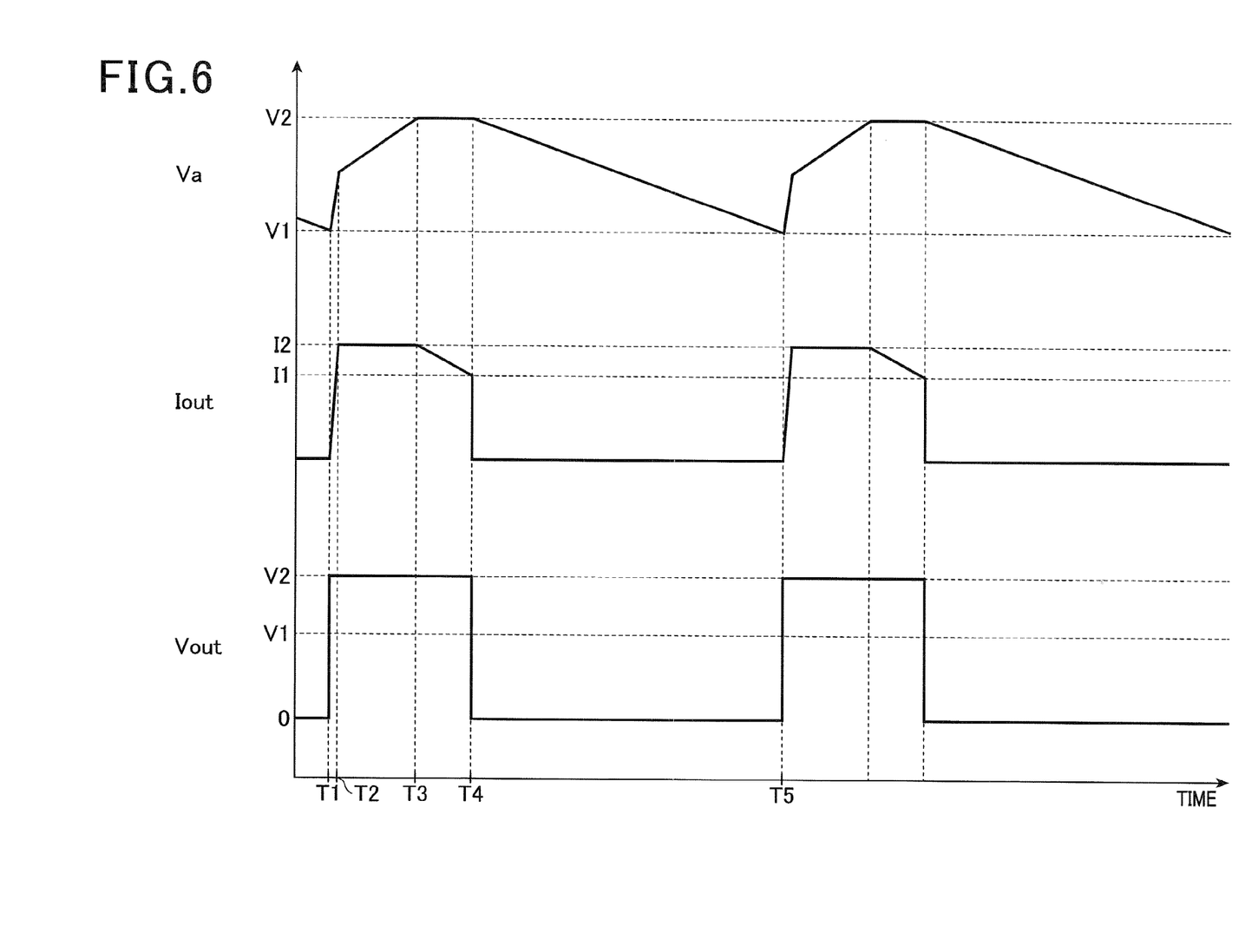
FIG. 6 is a timing diagram corresponding to an intermittent output mode.

FIG. 6 is a timing diagram concerning the output control of the DC-DC converter 10 according to the first embodiment. It is assumed that an amount of the current flowing through the electrical load 8 is a constant value lower than the current value I3.

At time T1, the output voltage (detected value Va) of the sub battery 7 decreases to be the lower limit value V1 due to power consumption during output suspension of the DC-DC converter 10. The output voltage of the sub battery 7 decreases to be the lower limit value V1, whereby the DC-DC converter becomes the output-active state so as to start outputting power. At this point, the command value Vout of the output voltage of the DC-DC converter 10 is set to be the upper limit value V2 and the output current Iout of the DC-DC converter 10 rapidly increases.

At time T2, the output current Iout reaches the upper limit value I2 in response to a rapid increase in the output current Iout. After time T2, in the DC-DC converter 10, the constant current control is performed so as to control the output current Iout to be the upper limit value I2. In more detail, in a period from time T1 to T2, the output current Iout rapidly increases to be at the current I2 which is the maximum permitted value. The time at which the output current Iout reaches the current I2 is prior to the time at which the detected value Va reaches the voltage value V2. After time T2, the detected value Va increases in response to an increase in an open end voltage at the sub battery 7 (i.e., voltage between terminals when current is not flowing through the battery). In other words, charge current into the sub battery 7 included in the output current Iout flows depending on the internal resistance of the sub battery 7 and is proportional to the difference between the open end voltage and the output voltage (Va). In this case, under a condition that the charge current is constant due to the constant current control, the output voltage of the sub battery 7 (Va) increases in response to an increase in the open end voltage at the sub battery 7 because of charging.

Subsequently, when the detected value Va reaches the voltage value V2 at time T3, the constant voltage control is performed to keep the detected value Va to be the voltage value V2. While the detected value Va is maintained constant, the charge current decreases in response to an increase in the open end voltage of the battery 7 because of the charging. Hence, the output current Iout decreases.

At time T4, when the output current Iout reaches the current I1, the output of the DC-DC converter 10 is stopped. Subsequently, power is supplied to the electrical load 8 from the sub battery 7. At time T5, when the detected value Va decreases to be the voltage value V1 due to discharging of the sub battery 7, the DC-DC converter 10 starts to output again.

According to the configuration as described above, the following effects and advantages can be obtained.

While the DC-DC converter 10 is in the output-active state, the output current Iout of the DC-DC converter 10 is controlled such that the output current Iout does not exceed the upper limit value I2 of the reference current zone X corresponding to the conversion efficiency E being higher than or equal to the predetermined value E1, thereby outputting power of the DC-DC converter 10. Hence, a decrease of the conversion efficiency E due to the output current Iout exceeding the upper limit value I2 of the reference current zone X can be suppressed.

When the DC-DC converter 10 starts to output power, the command value that enables an increase in the output current Iout exceeding the reference current zone X (upper limit value I2) is set to be the initial command value (equal to V2) of the output voltage at the DC-DC converter 10, and the current limiting starts to operate when the output current Iout is increased by the output power of the DC-DC converter 10 based on the initial command value. As a result, after the DC-DC converter starts to output power, the output current Iout rapidly increases to be at the current I2 which is the maximum permitted value of the output current Tout. Moreover, when the output current Iout increases, desired current limiting can be performed to avoid the output current Iout exceeding the current I2.

A configuration in which a constant current control is performed to keep the output current Iout to be at the upper limit value I2 of the reference current zone X is employed. According to the configuration, high conversion efficiency of the DC-DC converter is maintained and also the sub battery 7 can be charged earlier.

It is determined whether or not the required current of the electrical load 8 exceeds the predetermined current value I3 and the current limiting of the output current Iout is disabled when it is determined that the required current exceeds the current value I3. Specifically, in the DC-DC converter 10, instead of using intermittent output mode with the current limiting, a configuration of a continuous output mode operation without the current liming is employed. Therefore, the operation of the electrical load 8 is prevented from being unstable due to the current limiting operation.

The voltage supplied to the electrical load 8 is ranged from the lower limit value V1 of the reference voltage to the upper limit value V2 of the reference voltage. By this, the operation of the electrical load 8 being unstable due to a change of the voltage supplied to the electrical load 8 can be suppressed.

Second Embodiment

The power conversion system according to the second embodiment is mounted on a plug-in hybrid vehicle. The plug-in hybrid vehicle is equipped with an inlet and a charger in addition to the configuration as shown in FIG. 1. Hence, by connecting a charging cable to the inlet, a plug-in charging can be performed to charge the main battery from the commercial power source. Further, an ECU 30 of the power conversion system according to the second embodiment includes a function that acquires information indicating an activation of the plug-in charging. Furthermore, the ECU 30 serves as an electrical load used for performing a plug-in charging. That is, while the plug-in charging is performed, the ECU 30 is supplied with power from the sub battery 7, thereby controlling the plug-in charging.

Figure 7:
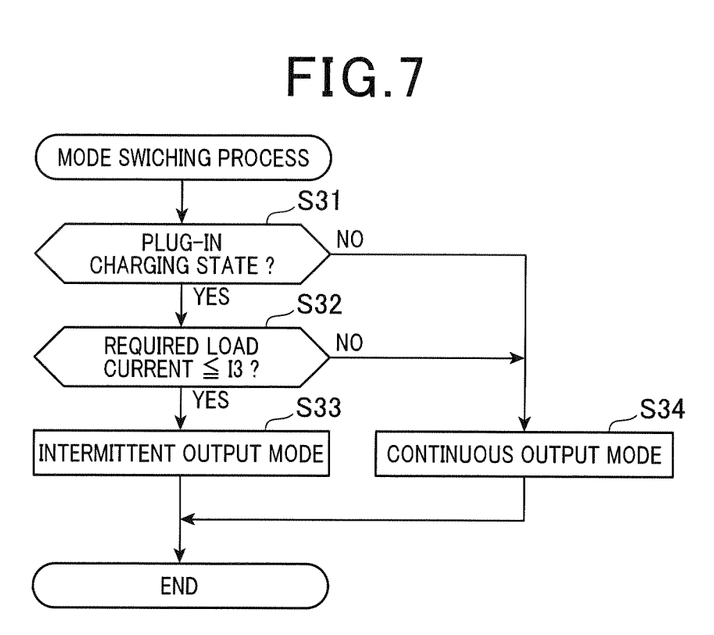
FIG. 7 is a flowchart showing a mode switching process according to the second embodiment.

FIG. 7 is a flowchart showing a mode switching process of the DC-DC converter 10 according to the second embodiment. The mode switching process is repeatedly executed at every predetermined period by the controller 11.

At step S31, the process acquires information from the ECU 30 so as to determine whether or not the vehicle is in a plug-in charging state. At step S31, when the vehicle is in the plug-in charging state (S31: YES), the process acquires the operation state of the electrical load 8 from the ECU 30 and determines whether or not the required current of the electrical load 8 is lower than or equal to the current value I3. When the process determines that the required current of the electrical load 8 is lower than or equal to the current value I3 (S32: YES), the process sets, at step S33, the control mode of the DC-DC converter 10 to be the intermittent output mode and terminates the process.

When the process determines that the vehicle is not in the plug-in charging mode (S31: NO) and the required current of the electrical load 8 is higher than the current value I3 (S32:NO), the process sets, at step S34, the control mode of the DC-DC converter 10 to be the continuous output mode and terminates the process.

According to the second embodiment, when the vehicle is in the plug-in charging state and the required current of the electrical load 8 is relative low, the control mode of the DC-DC converter 10 is set to be the intermittent output mode. Therefore, in the plug-in charging mode, an output control process is performed as shown in FIG. 5 and the DC-DC converter 10 is avoided from lowering the conversion efficiency. Accordingly, power loss at the DC-DC converter 10 while the vehicle is in the plug-in charging state is reduced and charging the main battery 6 and the sub battery 7 can be completed earlier. Further, when the plug-in charging is not performed, that is, the vehicle is in normal operation, the DC-DC converter 10 operates by the continuous output mode. As a result, in the normal operation mode, occurrence of a malfunction that voltage supplied to the electrical load 8 fluctuates due to intermittent output of the DC-DC converter can be suppressed.

Third Embodiment

Figure 8:
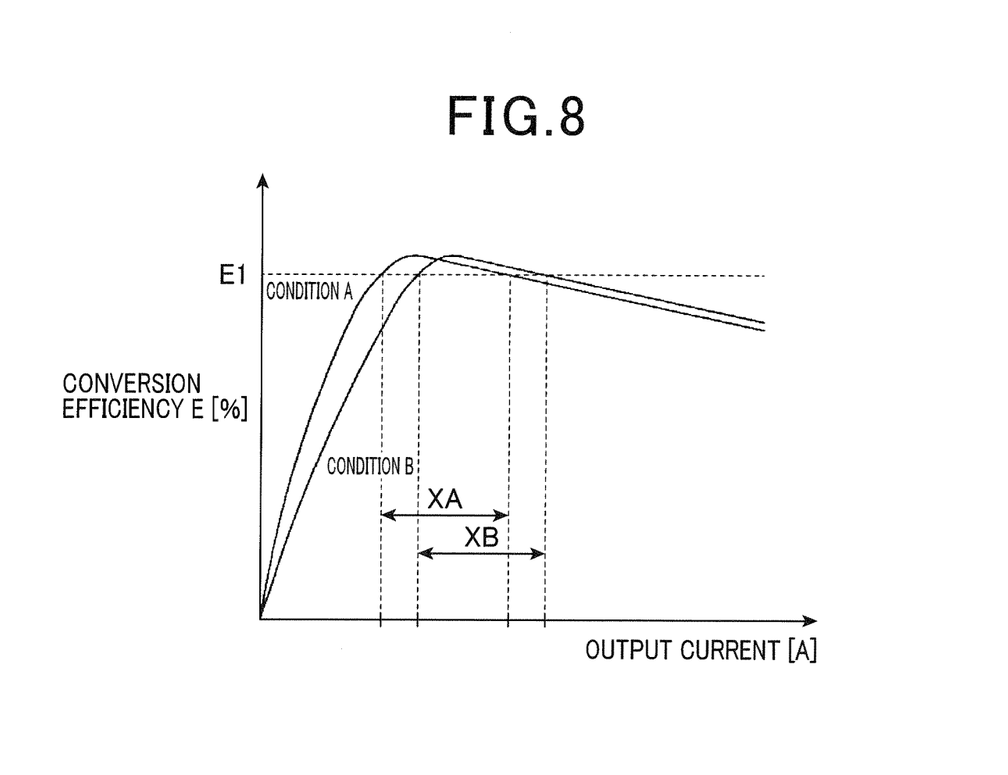
FIG. 8 is a graph showing a characteristics of the output current vs conversion efficiency of the DC-DC converter under different conditions.

The characteristics of the output current vs conversion efficiency of the DC-DC converter 10 vary depending on the temperature. FIG. 8 shows characteristics of the output current vs conversion efficiency characteristic under two different temperature conditions. A region XB where the conversion efficiency E is higher than or equal to E1 under a condition B, is shifted towards a region having larger output current Iout, compared with a region XA where the conversion efficiency E is higher than or equal to E1 under a condition A.

Figure 9:
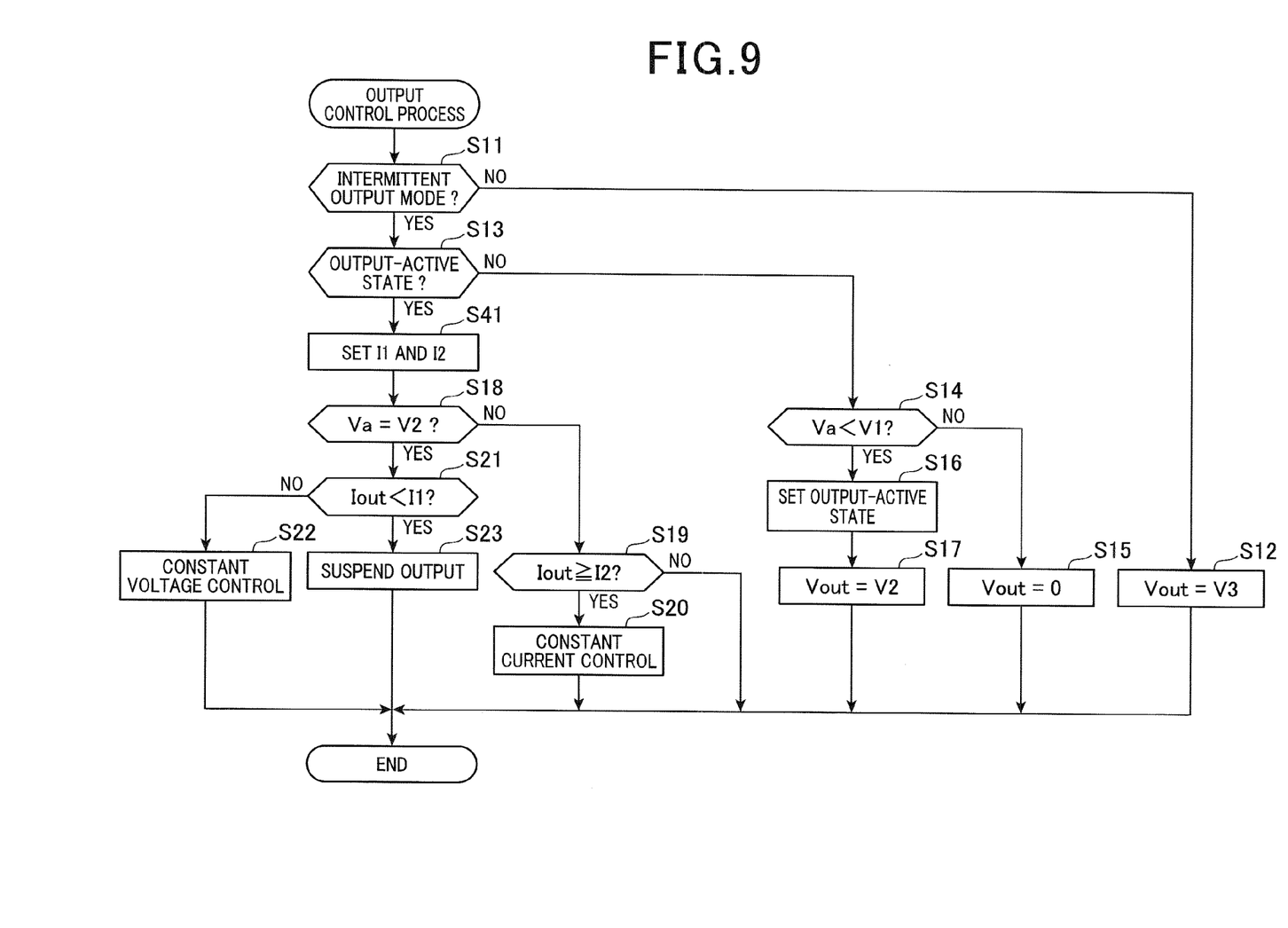
FIG. 9 is a flowchart showing an output control process according to the third embodiment.

According to the third embodiment, the reference current zone X (I1 to I2) of the output current Iout is set variably based on the temperature condition of the DC-DC converter 10. Specifically, as shown in FIG. 9 in which a part of FIG. 5 is modified, as a step S41 following step S13, the lower limit value I1 and the upper limit value I2 of the reference current zone X are set based on the temperature condition of the DC-DC converter 10 (variable setting unit). For example, when the output current JO corresponding to the maximum value of the conversion efficiency E becomes larger as the temperature rises, the lower limit value I1 and the upper limit value I2 of the reference current zone Z are set to be larger depending on an increase in the temperature. With this configuration, the conversion efficiency of the power conversion system can be improved. Since the characteristics of the output current vs conversion efficiency of the DC-DC converter varies depending on the input voltage at the DC-DC converter 10 supplied from the main battery 6 and the output voltage at the DC-DC converter 10 as well, the reference current zone X can be set based on these conditions.

Other Embodiments

According to the above-described embodiments, the current zone (I1 to I2) corresponding to the conversion efficiency E being higher than E1 is set as the reference current zone X, and the reference value of the conversion efficiency E1 is used for both lower output current side and higher output current side with respect to the current value I0 corresponding to the maximum value E0 of the conversion efficiency E. However, instead of these settings, reference values of the conversion efficiency used for both the lower current side and the higher current side may be different from each other. In the lower current side and the higher current side with respect to the output current I0, an amount of decrease in the conversion efficiency E with respect to the output current Iout of the higher current side is smaller than that of the lower current side. Hence, it is preferable to expand the reference current zone X towards higher current side.

For example, while the DC-DC converter 10 is in the intermittent output mode, if the required current of the electrical load 8 is increased, as a countermeasure, the upper limit value of the reference current zone X may be increased. In this case, the output current is continuously limited with a change applied to the limit value for limiting the output current Iout.

According to the above-described embodiments, as a reference current, the reference current zone Z ranged from I1 to I2 is defined and the current is controlled not to exceed the current I2. Alternatively, the reference current can be set as the following manner. That is, a predetermined current I0 corresponding to the maximum conversion efficiency E0 is defined as the reference current and the output current Iout is controlled not to exceed the current I0. In other words, a constant current control may be employed to set the output current Iout to be a predetermined current I0. The current I0 is set as a value in which the conversion efficiency E decreases when the output current Iout increases to exceed the current I0.

According to the above-described embodiments, the constant voltage control is performed such that the detected value Va is kept at the voltage value V2 when the detected value Va of the voltage sensor 101 exceeds the voltage value V2 (T3 to T4 as shown in FIG. 6). However, a configuration in which the DC-DC converter 10 is controlled to be in the output-suspend state under a condition that the detected value Va reaches the voltage value V2 can be employed.

According to the above-described power conversion system, to operate the system, the intermittent output mode and the continuous output mode are switched. However, optionally, only the continuous output mode may be employed in the power conversion system.

The power conversion system according to the above-described embodiment is accomplished by a power conversion apparatus 100 including the voltage sensor 101 as a voltage detector, the controller 11 as limiting means and a DC-DC converter 10. However, this configuration can be modified. For example, a controller may be disposed outside the DC-DC converter 10. Specifically, the ECU 30 may include a function of the controller 11 of the above-described embodiments. Further, the current sensor that detects the output current Iout of the DC-DC converter 10 may be disposed outside the DC-DC converter 10. The voltage sensor that detects the output voltage of the sub battery 7 can be disposed in the sub battery 7.

The voltage conversion system is not necessarily mounted on the vehicle. For example, the voltage conversion system can be mounted on a construction machine or an agricultural machine. As a power source of the DC-DC converter 10, a constant voltage source instead of a storage battery such as the main battery 6 may be employed. As a DC-DC converter, an insulated DC-DC converter is employed according to the above-described embodiment. Alternatively, other types of DC-DC converter such as insulated DC-DC converter may be employed.

Regarding the sub battery 7, a storage battery other than a lead-acid battery, for example, a lithium ion battery can be employed. Moreover, a storage apparatus such as electric double layer capacitor may be employed.

What is claimed is:

1. A power conversion system comprising:
    a DC-DC converter electrically connected to an electrical load and a power storage apparatus, the power storage apparatus supplying power to the electrical load, the DC-DC converter converting a voltage of a DC power supplied to the DC-DC converter with a conversion efficiency and outputting power to the electrical load and the power storage apparatus;
    a voltage detector that detects an output voltage of the power storage apparatus as a voltage detection value;
    a current detector that detects an output current of the DC-DC converter as a current detection value; and
    a controller that controls the DC-DC converter such that the DC-DC converter starts outputting the power when the voltage detection value detected by the voltage detector is below a predetermined voltage and stops outputting the power when the current detection value detected by the current detector is below a reference current that corresponds to the conversion efficiency being larger than or equal to a predetermined conversion efficiency,
    wherein
    the reference current is determined as a current value at which the conversion efficiency is decreased to be lower than the predetermined conversion efficiency when the output current exceeds the current value in response to an increase in the output current and the controller includes a limiting means configured to limit the output current not to exceed the reference current while the DC-DC converter is outputting the power.

2. The power conversion system according to claim 1, wherein
    the controller sets a command value that enables an increase in the output current to exceed the reference current when the DC-DC converter starts outputting the power, as an initial command value; and
    the limiting means is configured to start to limit the output current when the output current increases in response to the power outputted by the DC-DC converter based on the initial command value.

3. The power conversion system according to claim 1, wherein
    the reference current has a range specified by an upper limit value and a lower limit value;
    the controller stops an output of the DC-DC converter when the current detection value is lower than the lower limit value of the reference current; and
    the limiting means is configured to limit, after the DC-DC converter starts outputting the power, the output current of the DC-DC converter to be the upper limit value of the reference current when the current detection value reaches the upper limit value of the reference current.

4. The power conversion system according to claim 2, wherein
    the reference current has a range specified by an upper limit value and a lower limit value;
    the controller stops an output of the DC-DC converter when the current detection value is lower than the lower limit value of the reference current; and
    the limiting means is configured to limit, after the DC-DC converter starts outputting the power, the output current of the DC-DC converter to be the upper limit value of the reference current when the current detection value reaches the upper limit value of the reference current.

5. The power conversion system according to claim 1, wherein
    the controller includes a variable setting unit that sets the reference current to be variable.

6. The power conversion system according to claim 2, wherein
    the controller includes a variable setting unit that sets the reference current to be variable.

7. The power conversion system according to claim 3, wherein
    the controller includes a variable setting unit that sets the reference current to be variable.

8. The power conversion system according to claim 1, wherein
    the controller changes, based on a current required by the electrical load, an operation mode of the DC-DC converter between a limiting mode that limits the output current and a disabled-limiting mode that disables limiting the output current.

9. The power conversion system according to claim 2, wherein
    the controller changes, based on a current required by the electrical load, an operation mode of the DC-DC converter between a limiting mode that limits the output current and a disabled-limiting mode that disables limiting the output current.

10. The power conversion system according to claim 3, wherein
    the controller changes, based on a current required by the electrical load, an operation mode of the DC-DC converter between a limiting mode that limits the output current and a disabled-limiting mode that disables limiting the output current.

11. The power conversion system according to claim 4, wherein
    the controller changes, based on a current required by the electrical load, an operation mode of the DC-DC converter between a limiting mode that limits the output current and a disabled-limiting mode that disables limiting the output current.

12. The power conversion system according to claim 1, wherein
    the power conversion system includes a main battery and a sub battery as a storage power apparatus, the power conversion system being adapted to a plug-in hybrid vehicle; and
    the limiting means is configured to limit the output current under a condition that the plug-in hybrid vehicle is plug-in charging and power is supplied from the sub battery to the electrical load to perform the plug-in charging.

* * * * *